US012656273B2

(12) United States Patent
Liu et al.

(10) Patent No.: US 12,656,273 B2
(45) Date of Patent: Jun. 16, 2026

(54) INSPECTION SYSTEM AND METHOD

(71) Applicant: NUCTECH COMPANY LIMITED, Beijing (CN)

(72) Inventors: Bicheng Liu, Beijing (CN); Weizhen Wang, Beijing (CN); Chunguang Zong, Beijing (CN); Shangmin Sun, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 283 days.

(21) Appl. No.: 18/575,288

(22) PCT Filed: Jul. 1, 2022

(86) PCT No.: PCT/CN2022/103232
§ 371 (c)(1),
(2) Date: Dec. 28, 2023

(87) PCT Pub. No.: WO2023/280057
PCT Pub. Date: Jan. 12, 2023

(65) Prior Publication Data
US 2024/0319112 A1 Sep. 26, 2024

(30) Foreign Application Priority Data
Jul. 9, 2021 (CN) .......................... 202110777904.5

(51) Int. Cl.
*G01N 23/02* (2006.01)
(52) U.S. Cl.
CPC ..... *G01N 23/02* (2013.01); *G01N 2223/1006* (2013.01); *G01N 2223/206* (2013.01); *G01N 2223/64* (2013.01)

(58) Field of Classification Search
CPC ................... G01N 23/02; G01N 23/04; G01N 2223/1006; G01N 2223/206;
(Continued)

(56) References Cited

U.S. PATENT DOCUMENTS

2014/0333326 A1 11/2014 Peschmann et al.
2018/0270941 A1 9/2018 Nighan, Jr. et al.

FOREIGN PATENT DOCUMENTS

CN 1127060 A 7/1996
CN 1144039 C 3/2004
(Continued)

OTHER PUBLICATIONS

Machine English language translation for CN 203416494 U Jan. 29, 2014—entire document—(Year: 2014).*
(Continued)

*Primary Examiner* — Jurie Yun
(74) *Attorney, Agent, or Firm* — Kilpatrick Townsend & Stockton LLP

(57) ABSTRACT
The present disclosure relates to an inspection system and method. The inspection system includes: a ray source, configured to generate rays having different energies; a detector, configured to detect a signal when a ray emitted by the ray source acts on at least one cross section of an inspected object; and a processor, in communication connection with the ray source, configured to adjust an energy of the ray emitted by the ray source according to information representing a material parameter of at least one cross section of the inspected object. The embodiments of the present disclosure is capable of being applicable to radiation inspection of multiple types of inspected objects.

19 Claims, 4 Drawing Sheets

(58) Field of Classification Search
CPC .... G01N 2223/64; G01V 11/00; G01V 5/224;
H05G 1/58
See application file for complete search history.

(56) References Cited

FOREIGN PATENT DOCUMENTS

| CN | 1906502 | A | 1/2007 |
|---|---|---|---|
| CN | 1995993 | A | 7/2007 |
| CN | 101128731 | A | 2/2008 |
| CN | 101470084 | B | 12/2011 |
| CN | 102549413 | A | 7/2012 |
| CN | 203416494 | U | 1/2014 |
| CN | 104374783 | A | 2/2015 |
| CN | 102105815 | B | 9/2015 |
| CN | 103226114 | B | 9/2015 |
| CN | 104903708 | A | 9/2015 |
| CN | 107543835 | A | 1/2018 |
| CN | 208044090 | U | 11/2018 |
| CN | 113238298 | A | 8/2021 |
| EP | 2333528 | A2 | 6/2011 |

OTHER PUBLICATIONS

The Extended European Search Report issued in European corresponding application No. 22836808.0 mailed on May 28, 2025, 8 pages.

ISR received in PCT/CN2022/103232; mailed Sep. 21, 2022.

First OA received in CN Application No. 202110777904.5; mailed 17 Aug. 17, 2021.

Second OA received in CN Application No. 202110777904.5; mailed Sep. 15, 2021.

Third OA received in CN Application No. 202110777904.5; mailed Oct. 11, 2021.

Grant Notice received in CN Application No. 202110777904.5; mailed Feb. 8, 2022.

Comparing performances of a CdTe X-ray spectroscopic detector and an X-ray dual energy sandwich detector; by A. Gorecki et al.; published Nov. 19, 2013.

Optimized method for material identification using photon counting; by Guillaume Beldjoudi et al; published Jan. 21, 2012.

* cited by examiner

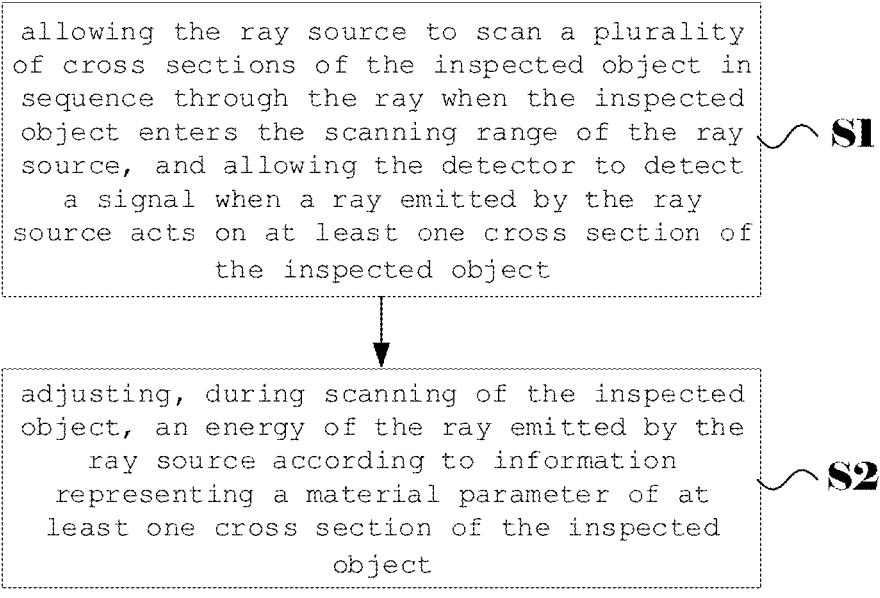

allowing the ray source to scan a plurality
of cross sections of the inspected object in
sequence through the ray when the inspected
object enters the scanning range of the ray
source, and allowing the detector to detect
a signal when a ray emitted by the ray
source acts on at least one cross section of
the inspected object

S1 adjusting, during scanning of the inspected
object, an energy of the ray emitted by the
ray source according to information
representing a material parameter of at
least one cross section of the inspected
object

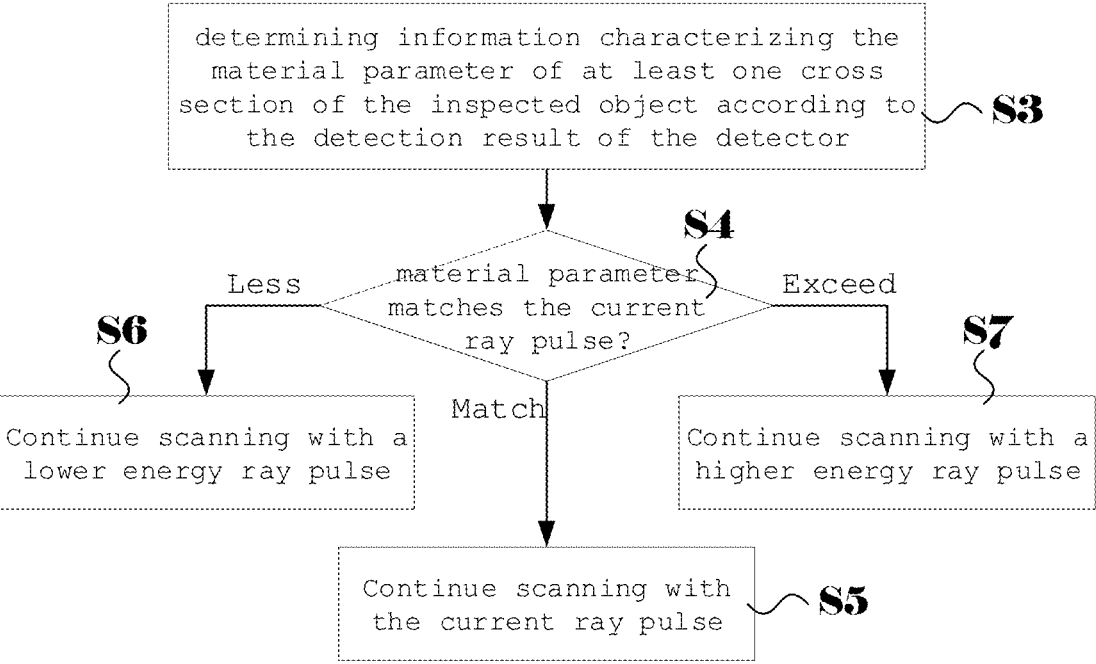

determining information characterizing the
material parameter of at least one cross
section of the inspected object according to
the detection result of the detector

S3 material parameter
matches the current
ray pulse?

S4

Less                                    Exceed

S6                                        S7

Continue scanning with a
lower energy ray pulse

Continue scanning with a
higher energy ray pulse

Match

Continue scanning with
the current ray pulse

INSPECTION SYSTEM AND METHOD

CROSS-REFERENCES TO RELATED APPLICATIONS

The present disclosure is a national phase application of International Application No. PCT/CN2022/103232, filed on Jul. 1, 2022, which claims priority to Chinese Application No. 202110777904.5, filed on Jul. 9, 2021, the entireties of which are herein incorporated by reference.

FIELD

The present disclosure relates to the field of radiation inspection, in particular to an inspection system and method.

BACKGROUND

In related arts, container inspection systems or vehicle inspection systems will select different ray sources directed at the types of inspected objects. For example, a container inspection system uses a ray source with higher ray energy, while a vehicle inspection system for passenger vehicles uses a ray source with lower ray energy.

SUMMARY

It is found by the inventor through study that the ray sources used by inspection systems in related arts are usually only applicable to specific types of inspected objects. For example, rays emitted by ray sources using lower ray energies have limited penetrating capability, so it is difficult to penetrate containers and goods therein, while ray sources using higher ray energies are easily to cause excessive irradiation dose, so it is difficult to satisfy the inspection needs of drivers in a drive-through mode.

In view of this, embodiments of the present disclosure provide an inspection system and method, which can be applicable to radiation inspection of multiple types of inspected objects.

In an aspect of the present disclosure, an inspection system is provided, including: a ray source, configured to generate rays having different energies; a detector, configured to detect a signal when a ray emitted by the ray source acts on at least one cross section of an inspected object; and a processor, in communication connection with the ray source, configured to adjust an energy of the ray emitted by the ray source according to information representing a material parameter of at least one cross section of the inspected object.

In some embodiments, the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy.

In some embodiments, the first energy is smaller than 1 MeV, and both the second energy and the third energy are greater than 1 MeV.

In some embodiments, the processor is in communication connection with the detector, and is configured to determine, according to a detection result of the detector, the information representing the material parameter of at least one cross section of the inspected object.

In some embodiments, the information representing the material parameter of at least one cross section of the inspected object includes an intensity of a column of signals attenuated, detected by the detector, of a ray penetrating the inspected object, or a gray value of a detection image formed according to the column of signals.

In some embodiments, the processor is configured to: allow the ray source to scan cross sections of the inspected object in sequence through a ray pulse, and determine, according to a detection signal from the detector, the information representing the material parameter of at least one cross section of the inspected object; allow the ray source to continue scanning with a currently emitted ray pulse if it is determined that the material parameter of the scanned current cross section of the inspected object matches penetrating capability of the ray pulse currently emitted by the ray source according to the information; allow the ray source to emit a ray pulse having a higher energy to continue scanning if it is determined that the material parameter of the scanned current cross section of the inspected object exceeds the material parameter matching the penetrating capability of the ray pulse currently emitted by the ray source according to the information; and allow the ray source to emit a ray pulse having a lower energy to continue scanning if it is determined that the material parameter of the scanned current cross section of the inspected object is less than the material parameter matching the penetrating capability of the ray pulse currently emitted by the ray source according to the information.

In some embodiments, the processor is configured to: allow the ray source to emit a ray pulse having the lowest energy to continue scanning if it is determined that the material parameter of the scanned current cross section of the inspected object is less than to the material parameter matching the penetrating capability of the ray pulse currently emitted by the ray source according to the information.

In some embodiments, the processor is configured to: allow the ray source to emit a ray pulse having the highest energy to continue scanning if it is determined that the material parameter of the scanned current cross section of the inspected object exceeds the material parameter matching the penetrating capability of the ray pulse currently emitted by the ray source according to the information.

In some embodiments, the processor is configured to: allow the ray source to scan the inspected object through the first ray pulse when the inspected object enters a scanning range of the ray source.

In some embodiments, the processor is configured to set at least one first ray pulse for scanning between two adjacent second ray pulses, between two adjacent third ray pulses, or between a second ray pulse and a third ray pulse which are adjacent to each other when the ray source scans the inspected object through a second ray pulse or a third ray pulse.

In some embodiments, the processor is configured to set at least one second ray pulse for scanning between two adjacent third ray pulses when the ray source scans the inspected object through the third ray pulses.

In some embodiments, the ray source includes: an electronic beam generating device, configured to generate electronic beams; a microwave generating device, configured to generate a microwave; a microwave circulator having a power input port and at least two power output ports, the power input port being connected to the microwave generating device through a waveguide structure; accelerating tubes connected to the electronic beam generating device and respectively connected to the at least two power output ports, configured to receive electronic beams generated by the electronic beam generating device, respectively, and accelerate electronic beams respectively through microwaves received from the at least two power output ports, to generate rays having different energies, respectively; and a controller in signal connection with the processor, the electronic beam generating device and the microwave generating device, configured to perform, according to an instruction from the processor, chronological control on microwave power of the microwave generating device, and chronological control on beam loadings of the electronic beams generated by the electronic beam generating device and respectively corresponding to accelerating tubes.

In some embodiments, the ray source includes: a first electronic gun, configured to generate a first electronic beam; a first electronic gun power source in signal connection with the controller and connected to the first electronic gun, configured to adjust a beam loading of the first electronic beam according to a chronological control signal provided by the controller; a second electronic gun, configured to generate a second electronic beam; and a second electronic gun power source in signal connection with the controller and connected to the second electronic gun, configured to adjust a beam loading of the second electronic beam according to a chronological control signal provided by the controller, and the controller is configured to allow the first electronic gun power source to adjust the beam loading of the first electronic beam to be a first beam loading at a first time period in each period of at least one period, and to allow the second electronic gun power source to adjust the beam loading of the second electronic beam to be a second beam loading at a second time period in each period, and the first time period does not coincide with the second time period.

In some embodiments, at least two power output ports of the microwave circulator include a first power output port and a second power output port, the first power output port is allocated with a microwave signal fed from the power input port, and the second power output port is allocated with a microwave signal fed from the first power output port; and accelerating tubes include: a first accelerating tube connected to the first power output port and the first electronic gun, configured to accelerate the first electronic beam through a first output microwave signal output by the first power output port; and a second accelerating tube connected to the second power output port and the second electronic gun, configured to accelerate the second electronic beam through a second output microwave signal output by the second power output port.

In some embodiments, at least two power output ports of the microwave circulator further include a third power output port, the third power output port is allocated with a microwave signal fed from the second power output port; and ray source further includes: an absorbing load connected to the third power output port, configured to absorb a microwave signal output by the third power output port.

In some embodiments, the microwave circulator includes a four-port circulator.

In some embodiments, the controller is configured to allow a microwave signal fed by the microwave generating device to the power input port of the microwave circulator to include at least one first input microwave signal at the first time period, and to allow the microwave signal fed by the microwave generating device to the power input port of the microwave circulator to include at least one second input microwave signal at the second time period, and a power of the at least one first input microwave signal is greater than that of the at least one second input microwave signal.

In some embodiments, the microwave generating device includes a magnetron.

In an aspect of the present disclosure, an inspection method based on the foregoing inspection system is provided, including: allowing the ray source to scan cross sections of the inspected object in sequence through the ray when the inspected object enters the scanning range of the ray source, and allowing the detector to detect a signal when a ray emitted by the ray source acts on at least one cross section of the inspected object; and adjusting, during scanning of the inspected object, an energy of the ray emitted by the ray source according to information representing a material parameter of at least one cross section of the inspected object.

In some embodiments, the inspection method further includes: determining, according to a detection result of the detector, information representing the material parameter of at least one cross section of the inspected object; allowing the ray source to continue scanning with a currently emitted ray pulse if it is determined that the material parameter of the scanned current cross section of the inspected object matches penetrating capability of the ray pulse currently emitted by the ray source according to the information; allowing the ray source to emit a ray pulse having a higher energy to continue scanning if it is determined that the material parameter of the scanned current cross section of the inspected object exceeds the material parameter matching the penetrating capability of the ray pulse currently emitted by the ray source according to the information; and allowing the ray source to emit a ray pulse having a lower energy to continue scanning if it is determined that the material parameter of the scanned current cross section of the inspected object is less than the material parameter matching the penetrating capability of the ray pulse currently emitted by the ray source according to the information.

In some embodiments, the inspection method further includes: allowing the ray source to emit a ray pulse having the lowest energy to continue scanning if it is determined that the material parameter of the scanned current cross section of the inspected object is less than to the material parameter matching the penetrating capability of the ray pulse currently emitted by the ray source according to the information.

In some embodiments, the inspection method further includes: allowing the ray source to emit a ray pulse having the highest energy to continue scanning if it is determined that the material parameter of the scanned current cross section of the inspected object exceeds the material parameter matching the penetrating capability of the ray pulse currently emitted by the ray source according to the information.

In some embodiments, the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy, and the inspection method further includes: allowing the ray source to scan the inspected object through the first ray pulse when the inspected object enters a scanning range of the ray source.

In some embodiments, the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy, and the inspection method further includes: setting at least one first ray pulse for scanning between two adjacent second ray pulses, between two adjacent third ray pulses, or between a second ray pulse and a third ray pulse which are adjacent to each other when the ray source scans the inspected object through a second ray pulse or a third ray pulse.

In some embodiments, the inspection method further includes: setting at least one second ray pulse for scanning between two adjacent third ray pulses when the ray source scans the inspected object through the third ray pulses.

Therefore, according to the embodiments of the present disclosure, the energy of the ray emitted by the ray source is adjusted according to information representing the material parameter of at least one cross section of the inspected object, to achieve adaptive radiation inspection of different types of inspected objects.

BRIEF DESCRIPTION OF THE DRAWINGS

The accompanying drawings, which form part of the description, illustrate embodiments of the present disclosure and together with the description, serve to explain the principles of the present disclosure.

The present disclosure can be more clearly understood from the following detailed descriptions with reference to the accompanying drawings, in which:

FIG. 8 is a flow diagram of some embodiments according to an inspection method of the present disclosure; and FIG. 9 is a flow diagram of some other embodiments according to an inspection method of the present disclosure.

It should be understood that the dimensions of various parts shown in the accompanying drawings are not drawn according to an actual scale relationship. In addition, the same or similar reference signs indicate the same or similar components.

DETAILED DESCRIPTION OF THE DISCLOSURE

Various exemplary embodiments of the present disclosure will now be described in detail with reference to the accompanying drawings. The descriptions of the exemplary embodiments are merely illustrative and are in no way intended to limit the present disclosure, and application or uses thereof. The present disclosure can be implemented in many different forms and is not limited to the embodiments described herein. These embodiments are provided, and the present disclosure will be thorough and complete, and will fully convey the scope of the present disclosure. It should be noted that unless otherwise specified, the relative arrangement of components and steps, the composition of materials, numerical expressions and numerical values set forth in these embodiments should be interpreted as merely illustrative and not as limitative. Similar words of "first", "second" and the like used in the present disclosure do not indicate any order, quantity or importance, but are only used to distinguish different parts. Similar words such as "including" or "comprising" mean that the elements before the word cover the elements listed after the word, without excluding the possibility of covering other elements. "Upper", "lower", "left", "right" and the like are only used to indicate a relative positional relationship. After the absolute position of a described object changes, the relative positional relationship may also change accordingly.

In the present disclosure, when it is described that a specific device is located between a first device and a second device, there may be an intervening device between the specific device and the first device or the second device or not. When it is described that the specific device is connected to other devices, the specific device may be directly connected to the other devices without the intervening device, and may also have the intervening device without being directly connected to the other devices.

All terms (including technical terms or scientific terms) used in the present disclosure have the same meanings to which the present disclosure belongs, unless otherwise defined particularly. It should also be understood that the terms defined in, for example, general dictionaries should be interpreted as having the meanings consistent with their meanings in the context of the related art, and should not be interpreted in an idealized or extremely formal sense unless explicitly defined herein.

Technologies, methods and equipment known may not be discussed in detail, but the technologies, methods and equipment should be regarded as part of the description under appropriate circumstances.

Figures 1, 2, 3:
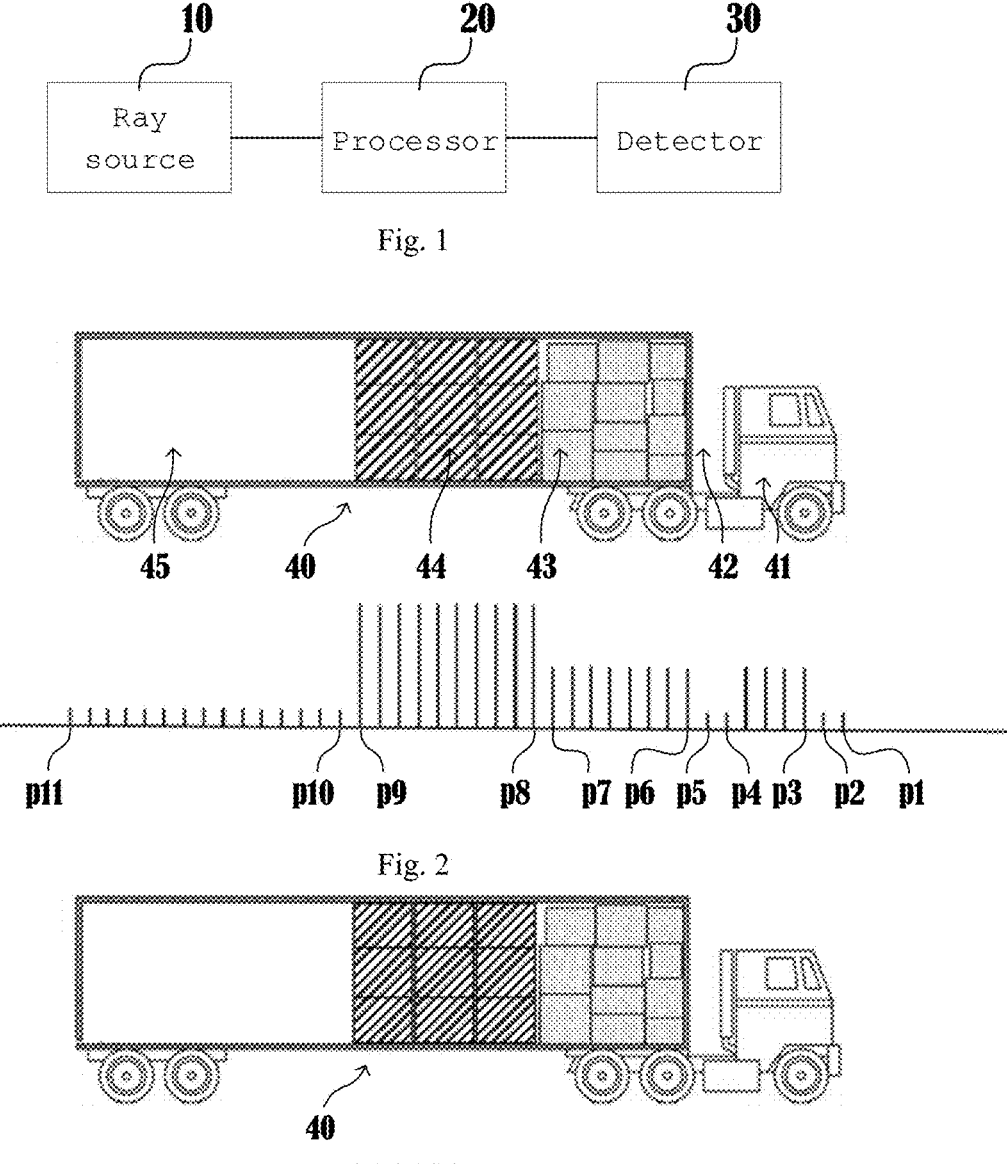
FIG. 1 is a structure diagram of some embodiments according to an inspection system of the present disclosure.
FIG. 2 to FIG. 4 are schematic diagrams of scanning states of a ray source performing inspection on a vehicle hauling goods of some embodiments according to an inspection system of the present disclosure, respectively.
Figures 4, 5:
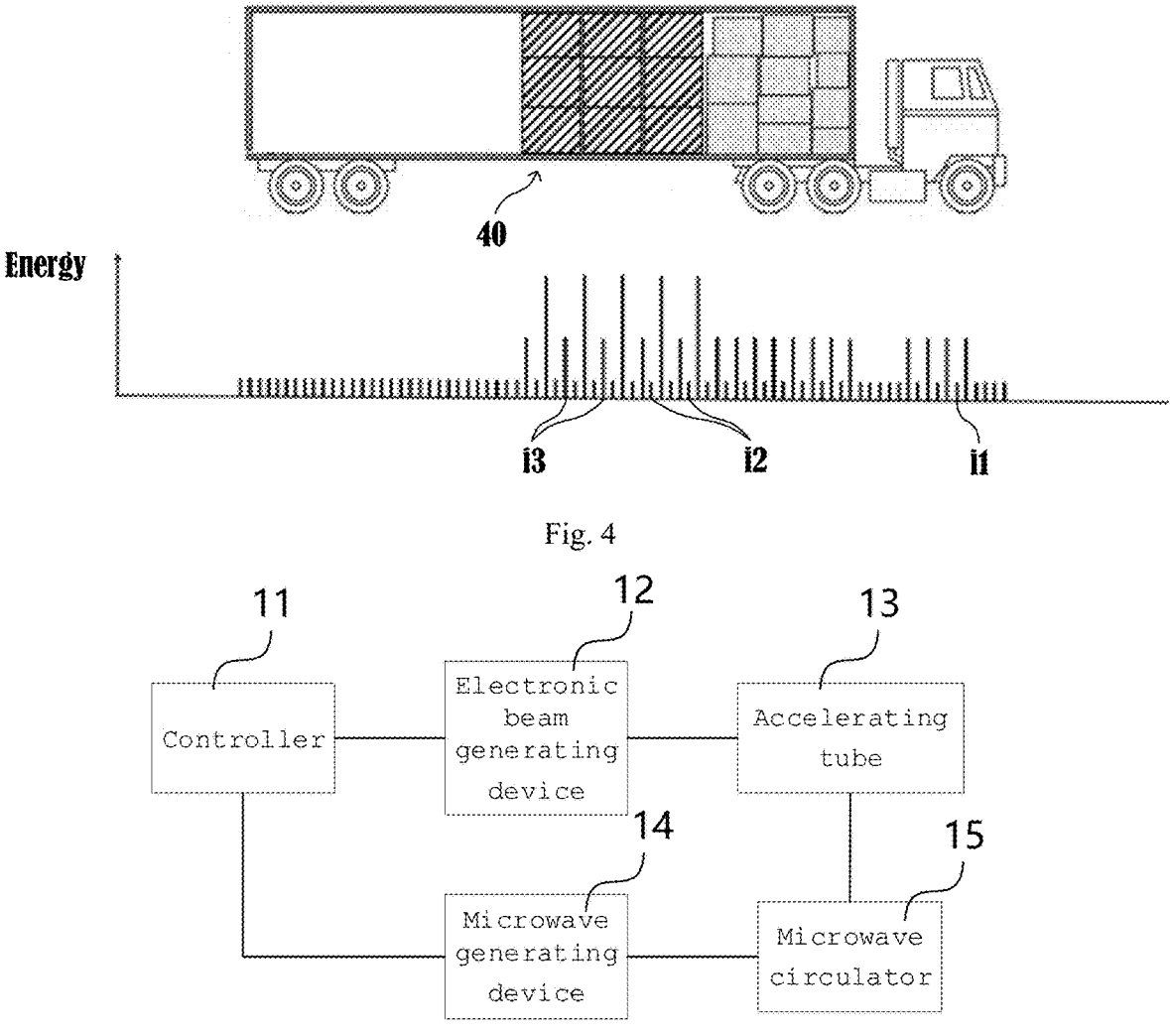
FIG. 5 is a structure diagram of a ray source in some embodiments according to an inspection system of the present disclosure.

FIG. 1 is a structure diagram of some embodiments according to an inspection system of the present disclosure. FIG. 2 to FIG. 4 are schematic diagrams of scanning states of a ray source performing inspection on a vehicle hauling goods of some embodiments according to an inspection system of the present disclosure, respectively. Referring to FIG. 1 to FIG. 4, in some embodiments, the inspection system includes a ray source 10, a detector 30 and a processor 20. The ray source 10 is configured to generate rays having different energies.

In some embodiments, the ray source 10 includes ray sources, which output ray pulses with different energies, respectively. In some other embodiments, the ray source 10 may include a single ray source capable of outputting ray pulses with different energies. There are more than two types of ray pulses having different energies implemented by the ray source 10, for example, three types of ray pulses having energies of 300 keV, 3 MeV and 6 MeV. The ray source 10 can generate X-ray pulses having different energies or other types of ray pulses having different energies.

In some embodiments, the ray source 10 is configured to selectively generate a first ray pulse having a first energy, a second ray pulse having a second energy, or a third ray pulse having a third energy according to an instruction from the processor 20. The first energy is smaller than the second energy, and the second energy is smaller than the third energy.

The first energy may be smaller than 1 MeV, for example, 225 keV, 300 keV or 450 keV. The first ray pulse may be a ray pulse having the lowest energy provided by the ray source 10 in an operating state.

Both the second energy and the third energy are greater than 1 MeV, e.g., 3 MeV and 6 MeV, 4 MeV and 6 MeV, 4 MeV and 7 MeV, or 6 MeV and 9 MeV, or the like, respectively. The second ray pulse having the second energy and the third ray pulse having the third energy may be used as standby rays for improving the penetrating capability under different material parameter conditions.

The detector 30 is configured to detect a signal when a ray emitted by the ray source 10 acts on at least one cross section of an inspected object 40. In some embodiments, the detector 30 may also be provided on a side opposite to the ray source 10. For example, when the ray source 10 emits X-ray pulses, the X-ray is attenuated after penetrating the inspected object and then is detected by the detector 30 located on the other side, to form a column of signals, which may reflect information about the material parameter of the cross section of the inspected object that the X-ray penetrates at the current moment, in order to reflect the internal structure of the inspected object.

In this embodiment, the inspected object may be a container, a truck hauling goods, a passenger vehicle, a commercial vehicle, a train, or the like. During the inspection, the inspected object and the ray source may move relative to each other. In some embodiments, the ray source keeps stationary, and the inspected object moves through its own power or is drived to move by other mechanisms. In some other embodiments, the inspected object keeps stationary, and the ray source moves through its own power or is drived to move by other mechanisms.

The processor 20 is in communication connection with the ray source 10, and is configured to adjust an energy of the ray emitted by the ray source 10 according to information representing a material parameter of at least one cross section of the inspected object 40.

The ray interacts with the inspected object when penetrating the inspected object, and the portion absorbed by the inspected object is related to the material parameter on the penetrating path. In some embodiments, the material parameter may include one or more information of a thickness, a density and an atomic number. That is, the attenuation of the intensity of the rays after the ray penetrates the inspected object depends on at least one of the density, thickness and atomic number on the path of the ray. For example, the attenuation of the intensity of the ray after the ray penetrates the inspected object depends on the density and thickness on the path of the ray.

In a radiation scanning system, there is a certain correspondence between the material parameter and the energy of the ray emitted by the ray source. For example, when the material parameter exceeds the correspondent relational value, the ray pulses can not penetrate goods, resulting in uneven scanning. When the material parameter is less than the correspondent relational value, most of the ray pulses penetrate the inspected object, resulting in wasted energy and the risk of ray dose.

In some embodiments, the information representing the material parameter of at least one cross section of the inspected object 40 is a calculated parameter. In some other embodiments, the information representing the material parameter of at least one cross section of the inspected object 40 may include a intensity of a column of signals attenuated, detected by the detector 30, of a ray penetrating the inspected object 40. The information may also include a gray value of a detection image formed according to the column of signals. When the intensity of the column of signals is too low or the gray value is too small, the ray pulses emitted by the ray source 10 are relatively more attenuated when penetrating the inspected object, at which point the energy of the ray pulses is relatively low with respect to the material parameter of the cross section. When the intensity of the column of signals is too high or the gray value is too large, the ray pulses emitted by the ray source 10 are relatively less attenuated when penetrating the inspected object, at which point the energy of the ray pulses is relatively high with respect to the material parameter of the cross section.

The processor 20 may obtain information representing the material parameter of at least one cross section of the inspected object in a variety of ways. In some embodiments, the processor 20 is in communication connection with the detector 30, and is configured to determine, according to a detection result of the detector 30, the information representing the material parameter of at least one cross section of the inspected object 40. In some other embodiments, the processor 20 may also receive the directly input information representing the material parameter of at least one cross section of the inspected object 40.

In the above embodiments, the energy of the ray emitted by the ray source is adjusted according to the information representing the material parameter of at least one cross section of the inspected object, and the energy of the ray matches the material parameter of the scanned cross section, to achieve adaptive radiation inspection of different types of inspected objects.

In some embodiments, the processor 20 is configured to allow the ray source 10 to scan cross sections of the inspected object 40 in sequence through a ray pulse, and determine, according to a detection signal from the detector 30, the information representing the material parameter of at least one cross section of the inspected object 40. For example, the inspected object 40 moves in a setting direction relative to the ray source 10 and the ray source 10 may consecutively scan cross sections of the inspected object 40 orderly. Accordingly, the processor 20 may determine information representing the material parameter of various cross sections of the inspected object 40 through the detection signal from the detector 30.

As for the processor 20, the ray source 10 is allowed to continue scanning with a currently emitted ray pulse if it is determined that the material parameter of the scanned current cross section of the inspected object 40 matches penetrating capability of the ray pulse currently emitted by the ray source 10 according to the information. The ray source 10 is allowed to emit a ray pulse having a higher energy to continue scanning if it is determined that the material parameter of the scanned current cross section of the inspected object 40 exceeds the material parameter matching the penetrating capability of the ray pulse currently emitted by the ray source 10 according to the information. The ray source 10 is allowed to emit a ray pulse having a lower energy to continue scanning if it is determined that the material parameter of the scanned current cross section of the inspected object 40 is less than the material parameter matching the penetrating capability of the ray pulse currently emitted by the ray source 10 according to the information.

In other words, the processor 20 can adaptively adjust the energy of the ray pulse emitted by the ray source 10 according to the material parameter of the currently scanned cross section of the inspected object 40, and the material parameter of the cross section following the currently scanned cross section of the inspected object 40 matches the penetrating capability of the ray pulse currently emitted by the ray source 10.

For ray sources that can implement ray pulses with more than three different energies, the adaptive adjustment of the processor here can be performed step by step according to the order of energy amount or in a grade skipping manner.

In some other embodiments, the processor 20 may also be configured to allow the ray source 10 to emit a ray pulse having the lowest energy to continue scanning if it is determined that the material parameter of the scanned current cross section of the inspected object 40 is less than the material parameter matching the penetrating capability of the ray pulse currently emitted by the ray source 10 according to the information. In other words, when a ray pulse having a lower energy is selected, the ray source is directly switched to emit the ray pulse with the lowest energy of ray pulses that can be implemented by the ray source. Step-by-step adjustment still can be performed in a direction that the energy is adjusted to be increased.

In some other embodiments, the processor 20 is configured to allow the ray source 10 to emit a ray pulse having the highest energy to continue scanning if it is determined that the material parameter of the scanned current cross section of the inspected object 40 exceeds the material parameter matching the penetrating capability of the ray pulse currently emitted by the ray source 10 according to the information. In other words, when a ray pulse having a higher energy is selected, the ray source is directly switched to emit the ray pulse with the highest energy of ray pulses that can be implemented by the ray source. Step-by-step adjustment still can be performed in the direction that the energy is adjusted to be reduced.

The meaning of the above expression "ray pulse having a higher energy" refers to a ray pulse with higher energy than the ray pulse currently emitted by the ray source, and the meaning of the above expression "ray pulse having the highest energy" refers to a ray pulse with the highest energy that can be implemented by the ray source. The meaning of the above expression "ray pulse having a lower energy" refers to a ray pulse with lower energy than the ray pulse currently emitted by the ray source, and the meaning of the above expression "ray pulse having the lowest energy" refers to a ray pulse with the lowest energy that can be implemented by the ray source.

With reference to the foregoing, a ray source 10 which can implement three types of ray pulses is taken as an example. The ray source 10 can emit a first ray pulse having a first energy, a second ray pulse having a second energy, and a third ray pulse having a third energy. The first energy is smaller than the second energy, and the second energy is smaller than the third energy. The ray source 10 may be allowed to scan the inspected object 40 through the first ray pulses when the inspected object 40 enters the scanning range of the ray source 10. In this way, unnecessary energy consumption on non-relevant areas of the inspected object 40 can be reduced, and radiation safety is also improved.

Referring to FIG. 2, when a container truck 40 drives into an inspection area, the ray source 10 may first emit a first ray pulse p1 having a first energy by identifying the position of a truck head 41. If the signal detected by the detector 30 after the first ray pulse p1 penetrates the cross section of the truck head is within a normal range, the ray source 10 continues emitting a first ray pulse p2 having the first energy to continue scanning the second cross section of the truck head. Here, the spacing of the cross sections of the inspected object is related to the beam-emitting frequency and scanning speed (i.e., the speed of relative movement between the ray source 10 and the inspected object) of the ray source.

In the case of the second cross section, the first ray pulse p2 may pass by an object with a high density, a high thickness or a high atomic number (e.g., an engine), at which point the detector detects more signal attenuation. Therefore, the intensity of the signal is weaker, and then the ray source 10 may emit a second ray pulse p3 with a higher level of energy to continue scanning cross sections corresponding to the engine.

When a gap 42 between the truck head and the truck body is scanned, the detector receives less signal attenuation, and the intensity is higher. Therefore, the ray source may emit first ray pulses p4 and p5 with a lower level of energy to scan cross sections corresponding to the gap 42, respectively.

When a portion of the truck body close to the truck head is scanned, and this portion accommodates goods 43 with a lower density, a lower thickness or a lower atomic number, the detector receives more signal attenuation, and the intensity is lower. Therefore, the ray source may emit second ray pulses p6 and p7 with a higher level of energy to scan cross sections corresponding to the goods 43, respectively.

When the middle portion of the truck body is scanned, and this portion accommodates goods 44 with a higher density, a higher thickness or a higher atomic number, the detector receives more signal attenuation, and the intensity is lower. Therefore, the ray source may emit third ray pulses p8 and p9 with a higher level of energy to scan cross sections corresponding to the goods 44, respectively.

When an empty portion 45 at the rear of the truck body is scanned, and this portion does not accommodate goods, the detector receives less signal attenuation, and the intensity is lower. Therefore, the ray source may emit first ray pulses p10 and p11 with the lowest level of energy to scan cross sections corresponding to the portion 45, respectively. The ray source 10 may stop emitting beams when it is identified that the truck tail has left the inspection area.

When the above processor determines the detection signal from the detector, determination may be made according to the maximum gray value and the minimum gray value of an image formed on the basis of the detection signal, for example, determining the value range of each of the maximum gray value and the minimum gray value, a difference between the maximum gray value and the minimum gray value, etc.

In FIG. 2, it is assumed that the scanning speed is 0.4 m/s and the beam-emitting frequency of the ray source is 40 Hz, and the spacing of respective scanned cross sections of the inspected object is calculated to be 10 mm on this account. In order to obtain richer information of an inspected material, referring to FIG. 3, in some embodiments, the processor 20 is configured to set at least one first ray pulse for scanning between two adjacent second ray pulses, between two adjacent third ray pulses, or between a second ray pulse and a third ray pulse which are adjacent to each other when the ray source 10 scans the inspected object 40 through a second ray pulse or a third ray pulse.

The beam-emitting logic of various ray pulses adopted by the ray source in FIG. 3 is substantially consistent with that in FIG. 2, but compared to FIG. 2, the beam-emitting frequency of the ray source is 80 Hz, and a first ray pulse is set for scanning between respective ray pulses based on FIG. 2, and the spacing of respective scanned cross sections of the inspected object is reduced to 5 mm. For example, in FIG. 3, a first ray pulse i1 is set for scanning between every two adjacent second ray pulses of second ray pulses corresponding to cross sections of the engine and the goods 43 in FIG. 2, and a first ray pulse i2 is set for scanning between every two adjacent third ray pulses of third ray pulses corresponding to cross sections of the goods 44. A first ray pulse is also set for scanning between the second ray pulse and the third ray pulse which are adjacent to each other. Furthermore, a first ray pulse can also be set for scanning between the adjacent first ray pulses in FIG. 2.

By setting the first ray pulses for scanning, it can reduce the spacing of respective scanned cross sections and to obtain richer information about the inspected object. In addition, the inserted first ray pulses have a lower energy, and will not cause a larger pressure on radiation protection.

For the portion with a larger material parameter (e.g., density, thickness, or atomic number, etc.) of the inspected object, it is also possible to obtain richer classification information such as the classification of organic matter, inorganic matter and mixtures, the classification of organic matter, inorganic matter, mixtures and heavy metals, or the like by alternative scanning of the third ray pulses and the second ray pulses. Referring to FIG. 4, in some embodiments, the processor 20 is configured to set at least one second ray pulse for scanning between two adjacent third ray pulses when the ray source 10 scans the inspected object 40 through the third ray pulses.

Compared to FIG. 3, a second ray pulse i3 is set between adjacent third ray pulses in FIG. 4 when cross sections of the goods 44 in FIG. 2 are scanned. A first ray pulse i1 is set between adjacent second ray pulses of second ray pulses corresponding to cross sections of the engine and the goods 43, respectively. A first ray pulse i2 is set between a second ray pulse i3 and a third ray pulse which are adjacent to each other.

The above examples apply to passenger vehicles in addition to trucks hauling containers. When the ray source 10 scans the cabs of a truck and a passenger vehicle, the energies of the first ray pulses and the second ray pulses employed may be in such a way that the radiation dose received by drivers and passengers does not exceed the safety level required by specifications.

FIG. 5 is a structure diagram of a ray source in some embodiments according to an inspection system of the present disclosure. Referring to FIG. 5, in some embodiments, the ray source 10 includes an electronic beam generating device 12, a microwave generating device 14, a microwave circulator 15, accelerating tubes 13, and a controller 11. The electronic beam generating device 12 is configured to generate electronic beams. In some embodiments, the electronic beam generating device 12 may cause electronic guns to generate electronic beams with the same or different beam loadings, respectively, by means of different high voltage amplitudes generated by a pulse modulator.

The microwave generating device 14 is configured to generate a microwave. In some embodiments, the microwave generating device 14 may generate varying operating currents by means of voltage of different amplitudes output from the pulse modulator, to generate microwave signals of different power. In some other embodiments, the microwave generating device 14 may also generate microwave signals of different power through variations of the magnetic field intensity. The microwave generating device 14 includes a magnetron 141.

The microwave circulator 15 has a power input port and at least two power output ports, and the power input port is connected to the microwave generating device 14 through a waveguide structure. The microwave circulator 15 has isolation characteristics and power allocation characteristics, and can transmit microwave energies along a single direction. By connecting the single microwave generating device

14 to the power input port of the microwave circulator 15, microwave energies fed from the power input port can be allocated to a specific power output port, and reflected microwave energies received by that power output port can be allocated to another power output port. By utilizing such characteristic of the microwave circulator 15 in conjunction with the chronological control of the microwave generating device 14, it is possible to achieve microwave energy output of more than two ports through the microwave generating device 14 as a single microwave power source.

Accelerating tubes 13 are connected to the electronic beam generating device 12, and connected to the at least two power output ports, respectively. Accelerating tubes 13 can receive electronic beams generated by the electronic beam generating device 12, respectively, and accelerate electronic beams respectively through the microwaves received from the at least two power output ports, to generate rays having different energies, respectively. The accelerated electronic beams may generate rays, such as X-rays, by bombarding a target.

The controller 11 is in signal connection with the electronic beam generating device 12 and the microwave generating device 14, and is configured to perform chronological control on microwave power of the microwave generating device 14, and chronological control on beam loadings of the electronic beams generated by the electronic beam generating device 12 and respectively corresponding to accelerating tubes 13. Through the chronological control performed by the controller 11 on the microwave generating device 14 and the electronic beam generating device 12, accelerating tubes 13 can respectively generate rays of different energies through a microwave power source, to implement the inspection needs of multi-energy spectrum coverage of an object, and improving the wire resolution indexes of the system while ensuring the penetrability.

Figure 6:
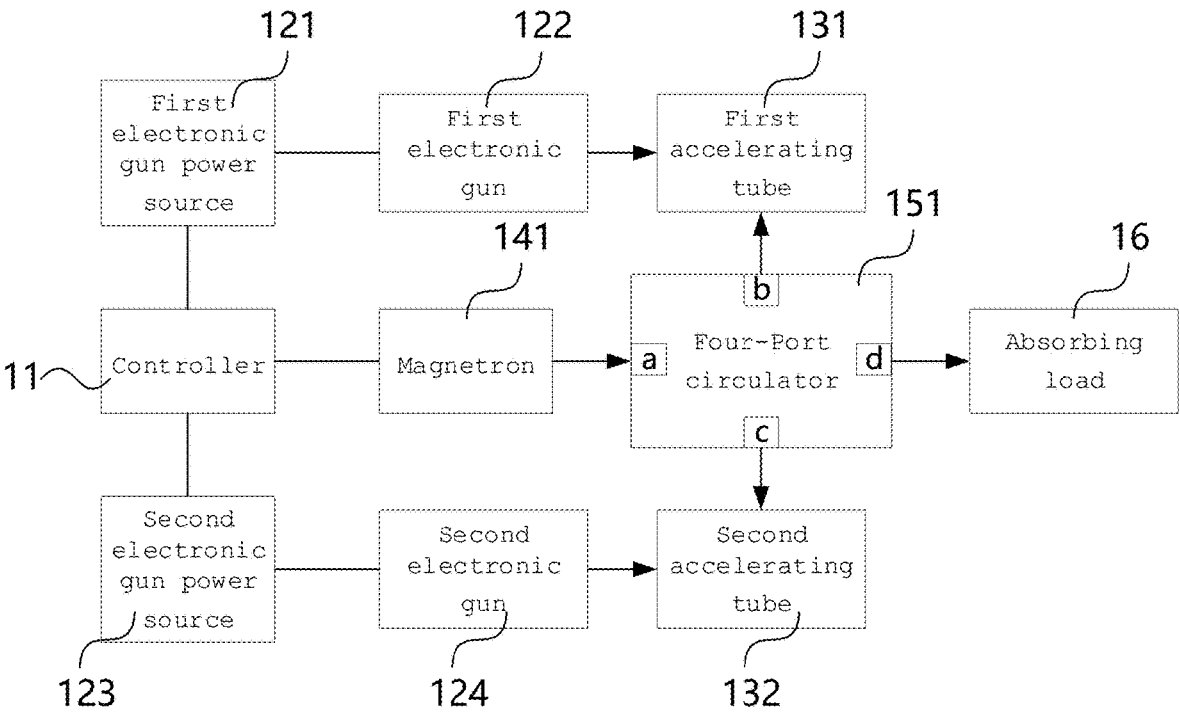
FIG. 6 is a structure diagram of a ray source in some other embodiments according to an inspection system of the present disclosure.
Figure 7:
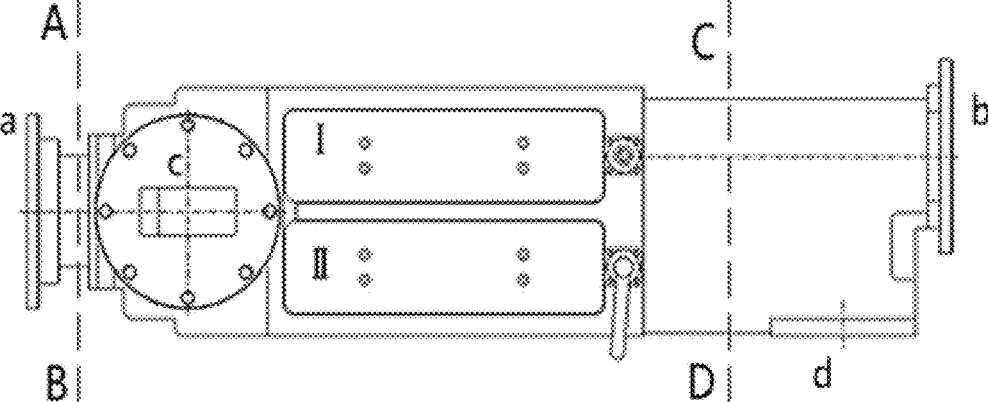
FIG. 7 is a structure diagram of a four-port circulator in some embodiments according to an inspection system of the present disclosure.

FIG. 6 is a structure diagram of a ray source in some other embodiments according to an inspection system of the present disclosure. FIG. 7 is a structure diagram of a four-port circulator in some embodiments according to an inspection system of the present disclosure. Referring to FIG. 6, in some embodiments, the electronic beam generating device 2 includes a first electronic gun 122, a first electronic gun power source 121, a second electronic gun 124, and a second electronic gun power source 123. The first electronic gun 122 is configured to generate a first electronic beam. The second electronic gun 124 is configured to generate a second electronic beam. Each electronic gun power source and the microwave generating device may be powered by the same AC power source (e.g., 380V).

The first electronic gun power source 121 is in signal connection with the controller 11 and connected to the first electronic gun 122, and is configured to adjust the beam loading of the first electronic beam according to a chronological control signal provided by the controller 11. The second electronic gun power source 123 is in signal connection with the controller 11 and connected to the second electronic gun 124, and is configured to adjust the beam loading of the second electronic beam according to a chronological control signal provided by the controller 11. The controller 11 may adjust voltages applied to the electronic guns by sending a chronological control signal (e.g., pulse width modulation signal) to the electronic gun power sources to further adjust the beam loadings of the electronic beams.

Referring to FIG. 6 and FIG. 7, in some embodiments, at least two power output ports of the microwave circulator 15 include a first power output port b and a second power output port c, the first power output port b is allocated with a microwave signal fed from the power input port a, and the second power output port c is allocated with a microwave signal fed from the first power output port b. The microwave signal fed from the first power output port b may be a reflected microwave signal that is reflected back after being output from the first power output port b.

In FIG. 6, accelerating tubes 13 include a first accelerating tube 131 and a second accelerating tube 132. The first accelerating tube 131 is connected to the first power output port b and the first electronic gun 122, and is configured to accelerate the first electronic beam through a first output microwave signal output by the first power output port b. The second accelerating tube 132 is connected to the second power output port c and the second electronic gun 124, and is configured to accelerate the second electronic beam through a second output microwave signal output by the second power output port c. The accelerated first and second electronic beams may generate X-rays of different energies by bombarding a target.

In some other embodiments, the electronic beam generating device may include more than three electronic guns and corresponding electronic gun power sources thereof, and the ray generating device includes more than three accelerating tubes. Accordingly, the accelerating tubes are connected to more than three power output ports of the microwave circulator, respectively, to realize output of more types of ray energies through the chronological control of the controller and implement the multi-energy spectrum inspection requirements and multi-viewpoint scanning requirements to the objects.

Referring to FIG. 6, in some embodiments, at least two power output ports of the microwave circulator 15 further include a third power output port d. The third power output port d is allocated with a microwave signal fed from the second power output port c. The microwave signal fed from the second power output port c may be a reflected microwave signal that is reflected back after being output from the second power output port c. The ray generating device may further include an absorbing load 16 connected to the third power output port d. The absorbing load can absorb the microwave signal output from the third power output port d to realize an isolation effect to prevent the microwave signal from returning to the power input port of the microwave circulator.

Referring to FIG. 7, in some embodiments, the microwave circulator 15 includes a four-port circulator 151. The four-port circulator 151 has four ports, which are a power input port a, a first power output port b, a second power output port c and a third power output port d in the power transmission sequence, respectively, that is, the power transmission rule of the four-port circulator 151 is a→b→c→d. In some other embodiments, the microwave circulator 15 may further include a combination structure of three-port circulators and four-port circulators connected in series.

FIG. 7 illustrates the structure of a ferrite four-port circulator. The four-port circulator is a coupled device including a dual-T joint, a nonreciprocal phase shifter based on ferrite field-displacement effect, and a 3 dB coupler. During the operation of the ray generating device, an electromagnetic wave of which the amplitude is $E_0$ is fed from the power input port a. Due to the dual-T (H branch) characteristic, electromagnetic waves with equal amplitude of $E_0/(2^{(1/2)})$ and equal phase will be output from waveguides I and II at side A-B. The nonreciprocal phase shifter can allow phase of the electromagnetic wave in the waveguide I to be 90° ahead relative to that in the waveguide II when the electromagnetic wave is forwardly transmitted from side A-B to side C-D (and conversely, the phase in the waveguide II is 90° ahead relative to the phase in the waveguide I if it is reversely transmitted from side C-D to side A-B), and the 3 dB coupler from side C-D to a location between the first power output port b and the third power output port d can cause the microwave power in the waveguides I and II to be equally divided to the first power output port b and the third power output port d, respectively, but the phase shift is increased by 90° during the coupling transmission, and all microwave power output from the waveguide I and the waveguide II to the first power output port b and the third power output port d, respectively, is output from the first power output port b, but is not output at the third power output port d.

Similarly, the microwave power input from the first power output port b is allocated to the second power output port c for output, and the microwave power input from the second power output port c is allocated to the third power output port d for output. Accordingly, the reflected microwave input from the first power output port b is allocated to the second power output port c for output, and the reflected wave from the second power output port c will be transmitted to the third power output port d and absorbed by the absorbing load.

In some embodiments, the chronological control by the controller 11 causes the first accelerating tube connected to the first power output port b to obtain larger power and energy to output at least one type of X-rays with higher energy, for example, X-rays with output energies of 6 MeV and 3 MeV; and the chronological control by the controller 11 causes the second accelerating tube connected to the second power output port c to obtain smaller power and energy to output at least one type of X-rays with lower energy, such as X-rays with output energies of 0.5 to 1 MeV. In this way, the effect of power allocation is achieved by differences of the microwave power output from different power output ports of the microwave circulator, and accelerating tubes with different energies can be driven by utilizing the power allocation characteristic of the microwave circulator, to implement various inspection requirements.

Based on the embodiments of the foregoing inspect system, the preset disclosure further provides inspection method embodiments. FIG. 8 is a flow diagram of some embodiments according to an inspection method of the present disclosure. Referring to FIG. 8, in some embodiments, the inspection method includes steps S1 and S2. In the step S1, the ray source 10 is allowed to scan cross sections of the inspected object 40 in sequence through the ray when the inspected object 40 enters the scanning range of the ray source 10, and the detector 30 is allowed to detect a signal when a ray emitted by the ray source 10 acts on at least one cross section of the inspected object 40.

In the step S2, during scanning of the inspected object 40, an energy of the ray emitted by the ray source 10 is adjusted according to information representing a material parameter of at least one cross section of the inspected object 40. The energy adjustment process in the step S2 may be carried out respectively at the time of scanning respective cross sections in the step S1.

FIG. 9 is a flow diagram of some other embodiments according to an inspection method of the present disclosure. Referring to FIG. 9, in some embodiments, the inspection method further includes steps S3 to S7. In the step S3, information representing the material parameter of at least one cross section of the inspected object 40 is determined according to a detection result of the detector 30.

In the step S4, whether the material parameter of the scanned current cross section of the inspected object 40 matches the penetrating capability of the ray pulse currently emitted by the ray source 10 according to the information is determined, and step S5 is performed if the material parameter of the scanned current cross section of the inspected object 40 matches the penetrating capability of the ray pulse currently emitted by the ray source 10, that is, the ray source 10 is allowed to continue scanning with the currently emitted ray pulse.

If it is determined that the material parameter of the scanned current cross section of the inspected object 40 exceeds the material parameter matching the penetrating capability of the ray pulse currently emitted by the ray source 10, step S6 is performed, that is, the ray source 10 is allowed to emit a ray pulse having a higher energy to continue scanning.

If it is determined that the material parameter of the scanned current cross section of the inspected object 40 is less than the material parameter matching the penetrating capability of the ray pulse currently emitted by the ray source 10, step S6 is performed, that is, the ray source is allowed to emit a ray pulse having a lower energy to continue scanning.

Referring to FIG. 9, in some embodiments, the ray source 10 can be allowed to directly emit a ray pulse having the lowest energy to continue scanning if it is determined that the material parameter of the scanned current cross section of the inspected object 40 is less than the material parameter matching the penetrating capability of the ray pulse currently emitted by the ray source 10 according to the information.

In some embodiments, the ray source 10 can be allowed to directly emit a ray pulse having the highest energy to continue scanning if it is determined that the material parameter of the scanned current cross section of the inspected object 40 exceeds the material parameter matching the penetrating capability of the ray pulse currently emitted by the ray source 10 according to the information.

Referring to FIG. 2, in some embodiments, the ray source 10 is configured to selectively generate a first ray pulse having a first energy, a second ray pulse having a second energy, or a third ray pulse having a third energy according to an instruction from the processor 20, the first energy is smaller than the second energy, and the second energy is smaller than the third energy. The inspection method further includes: allowing the ray source 10 to scan the inspected object 40 through the first ray pulse when the inspected object 40 enters a scanning range of the ray source 10.

Referring to FIG. 3, in some embodiments, the inspection method further includes: setting at least one first ray pulse for scanning between two adjacent second ray pulses, between two adjacent third ray pulses, or between a second ray pulse and a third ray pulse which are adjacent to each other when the ray source 10 scans the inspected object 40 through a second ray pulse or a third ray pulse.

Referring to FIG. 4, in some embodiments, the inspection method further includes: setting at least one second ray pulse for scanning between two adjacent third ray pulses when the ray source 10 scans the inspected object 40 through the third ray pulses.

Multiple embodiments in the specification are described in a progressive manner, with different emphasis on each embodiment, and the same or similar parts of various embodiments can be referred by each other. As for the method embodiments, due to the correspondence between their entirety plus the involved steps and the content in the apparatus embodiments, the description is relatively simple. Please refer to partial illustration of the apparatus embodiments for related details.

So far, various embodiments of the present disclosure have been described in detail. In order to avoid obscuring concepts of the present disclosure, some details that are well known in the art have not been described. How to implement the embodiments disclosed here according to the above descriptions.

Although some specific embodiments of the present disclosure have been described in detail through examples, it should be understood that the above examples are only for illustration and are not intended to limit the scope of the present disclosure. The above embodiments can be modified or some features can be replaced by equivalents without departing from the scope and spirit of the present disclosure. The scope of the present disclosure is defined by appended claims.

What is claimed is:

1. An inspection system, comprising:
a ray source, configured to generate a plurality of rays having different energies;
a detector, configured to detect a signal when a ray emitted by the ray source acts on at least one cross section of an inspected object; and
a processor, in communication connection with the ray source and the detector,
wherein the processor is configured to determine, according to a detection result of the detector an information representing a material parameter of the at least one ross section of the inspected object, and dynamically adjust an energy of the ray emitted by the ray source according to the information representing the material parameter of the at least one cross section of the inspected object.

2. The inspection system according to claim 1, wherein the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy.

3. The inspection system according to claim 2, wherein the first energy is smaller than 1 MeV, and both the second energy and the third energy are greater than 1 MeV.

4. The inspection system according to claim 2, wherein the processor is configured to:
allow the ray source to scan the inspected object through the first ray pulse when the inspected object enters a scanning range of the ray source.

5. The inspection system according to claim 2, wherein the processor is configured to set at least one first ray pulse for scanning between two adjacent second ray pulses, between two adjacent third ray pulses, or between a second ray pulse and a third ray pulse which are adjacent to each other when the ray source scans the inspected object through a second ray pulse or a third ray pulse.

6. The inspection system according to claim 5, wherein the processor is configured to set at least one second ray pulse for scanning between two adjacent third ray pulses when the ray source scans the inspected object through the third ray pulses.

7. The inspection system according to claim 1, wherein the information representing the material parameter of the at least one cross section of the inspected object comprises an intensity of a column of signals attenuated, detected by the detector, of a ray penetrating the inspected object, or a gray value of a detection image formed according to the column of signals.

8. The inspection system according to claim 1, wherein the processor is configured to:

allow the ray source to scan a plurality of cross sections of the inspected object in sequence through a ray pulse, and determine, according to a detection signal from the detector, the information representing the material parameter of at least one cross section of the inspected object;

allow the ray source to continue scanning with a currently emitted ray pulse if it is determined that the material parameter of the scanned current cross section of the inspected object matches penetrating capability of the ray pulse currently emitted by the ray source according to the information;

allow the ray source to emit a ray pulse having a higher energy to continue scanning if it is determined that the material parameter of the scanned current cross section of the inspected object exceeds the material parameter matching the penetrating capability of the ray pulse currently emitted by the ray source according to the information; and allow the ray source to emit a ray pulse having a lower energy to continue scanning if it is determined that the material parameter of the scanned current cross section of the inspected object is less than the material parameter matching the penetrating capability of the ray pulse currently emitted by the ray source according to the information.

9. The inspection system according to claim 8, wherein the processor is configured to:

allow the ray source to emit a ray pulse having the lowest energy to continue scanning if it is determined that the material parameter of the scanned current cross section of the inspected object is less than the material parameter matching the penetrating capability of the ray pulse currently emitted by the ray source according to the information.

10. The inspection system according to claim 1, wherein the ray source comprises:

an electronic beam generating device, configured to generate a plurality of electronic beams;

a microwave generating device, configured to generate a microwave;

a microwave circulator having a power input port and at least two power output ports, the power input port being connected to the microwave generating device through a waveguide structure;

a plurality of accelerating tubes connected to the electronic beam generating device and respectively connected to the at least two power output ports, configured to receive a plurality of electronic beams generated by the electronic beam generating device, respectively, and accelerate the plurality of electronic beams respectively through microwaves received from the at least two power output ports, wherein to generate a plurality of rays having different energies, respectively; and a controller in signal connection with the processor, the electronic beam generating device and the microwave generating device, configured to perform, according to an instruction from the processor, chronological control on microwave power of the microwave generating device, and chronological control on beam loadings of the electronic beams generated by the electronic beam generating device and respectively corresponding to the plurality of accelerating tubes.

11. The inspection system according to claim 10, wherein the ray source comprises:

a first electronic gun, configured to generate a first electronic beam;

a first electronic gun power source in signal connection with the controller and connected to the first electronic gun, configured to adjust a beam loading of the first electronic beam according to a chronological control signal provided by the controller;

a second electronic gun, configured to generate a second electronic beam; and a second electronic gun power source in signal connection with the controller and connected to the second electronic gun, configured to adjust a beam loading of the second electronic beam according to a chronological control signal provided by the controller, wherein the controller is configured to allow the first electronic gun power source to adjust the beam loading of the first electronic beam to be a first beam loading at a first time period in each period of at least one period, and to allow the second electronic gun power source to adjust the beam loading of the second electronic beam to be a second beam loading at a second time period in each period, and the first time period does not coincide with the second time period.

12. The inspection system according to claim 11, wherein the at least two power output ports of the microwave circulator comprise a first power output port and a second power output port, the first power output port is allocated with a microwave signal fed from the power input port, and the second power output port is allocated with a microwave signal fed from the first power output port; and the plurality of accelerating tubes comprise:

a first accelerating tube connected to the first power output port and the first electronic gun, configured to accelerate the first electronic beam through a first output microwave signal output by the first power output port; and a second accelerating tube connected to the second power output port and the second electronic gun, configured to accelerate the second electronic beam through a second output microwave signal output by the second power output port.

13. The inspection system according to claim 12, wherein at the least two power output ports of the microwave circulator further comprise a third power output port, the third power output port is allocated with a microwave signal fed from the second power output port; and the ray source further comprises: an absorbing load connected to the third power output port, configured to absorb a microwave signal output by the third power output port.

14. The inspection system according to claim 13, wherein the controller is configured to allow a microwave signal fed by the microwave generating device to the power input port of the microwave circulator to comprise at least one first input microwave signal at the first time period, and to allow the microwave signal fed by the microwave generating device to the power input port of the microwave circulator to comprise at least one second input microwave signal at the second time period, and a power of the at least one first input microwave signal is greater than that of the at least one second input microwave signal.

15. An inspection method based on the inspection system according to claim 1, comprising:

allowing the ray source to scan a plurality of cross sections of the inspected object in sequence through the ray when the inspected object enters a scanning range of the ray source, and allowing the detector to detect a signal when a ray emitted by the ray source acts on at least one cross section of the inspected object; and adjusting, during scanning of the inspected object, an energy of the ray emitted by the ray source according to information representing the material parameter of the at least one cross section of the inspected object.

16. The inspection method according to claim 15, further comprising:

determining, according to a detection result of the detector, information representing the material parameter of at least one cross section of the inspected object;

allowing the ray source to continue scanning with a currently emitted ray pulse if it is determined that the material parameter of the scanned current cross section of the inspected object matches penetrating capability of the ray pulse currently emitted by the ray source according to the information;

allowing the ray source to emit a ray pulse having a higher energy to continue scanning if it is determined that the material parameter of the scanned current cross section of the inspected object exceeds the material parameter matching the penetrating capability of the ray pulse currently emitted by the ray source according to the information; and allowing the ray source to emit a ray pulse having a lower energy to continue scanning if it is determined that the material parameter of the scanned current cross section of the inspected object is less than the material parameter matching the penetrating capability of the ray pulse currently emitted by the ray source according to the information.

17. The inspection method according to claim 16, further comprising:

allowing the ray source to emit a ray pulse having the lowest energy to continue scanning if it is determined that the material parameter of the scanned current cross section of the inspected object is less than the material parameter matching the penetrating capability of the ray pulse currently emitted by the ray source according to the information.

18. The inspection method according to claim 16, wherein the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy, wherein the inspection method further comprises:

allowing the ray source to scan the inspected object through the first ray pulse when the inspected object enters a scanning range of the ray source.

19. The inspection method according to claim 16, wherein the ray source is configured to selectively generate a first ray pulse having a first energy, a second ray pulse having a second energy, or a third ray pulse having a third energy according to an instruction from the processor, the first energy is smaller than the second energy, and the second energy is smaller than the third energy, wherein the inspection method further comprises:

setting at least one first ray pulse for scanning between two adjacent second ray pulses, between two adjacent third ray pulses, or between a second ray pulse and a third ray pulse which are adjacent to each other when the ray source scans the inspected object through a second ray pulse or a third ray pulse.

* * * * *